United States Patent
Bloch et al.

(10) Patent No.: US 8,576,715 B2
(45) Date of Patent: Nov. 5, 2013

(54) HIGH-PERFORMANCE ADAPTIVE ROUTING

(75) Inventors: Gil Bloch, Zichron Yaakov (IL); Diego Crupnicoff, Buenos Aires (AR); Michael Kagan, Zichron Yaakov (IL); Ido Bukspan, Herzliya (IL); Itamar Rabenstein, Petach Tikva (IL); Alon Webman, Tel Aviv (IL); Amiad Marelli, Tel Aviv (IL)

(73) Assignee: Mellanox Technologies Ltd., Yokneam (IL)

( * ) Notice: Subject to any disclaimer, the term of this patent is extended or adjusted under 35 U.S.C. 154(b) by 482 days.

(21) Appl. No.: 12/910,900

(22) Filed: Oct. 25, 2010

(65) Prior Publication Data

US 2011/0096668 A1    Apr. 28, 2011

Related U.S. Application Data

(60) Provisional application No. 61/254,756, filed on Oct. 26, 2009.

(51) Int. Cl.
*H04L 12/28*    (2006.01)

(52) U.S. Cl.
USPC ..................................................... 370/235

(58) Field of Classification Search
USPC ......... 370/241, 248, 252, 351, 389, 901, 902, 370/912, 229, 235, 238
See application file for complete search history.

(56) References Cited

U.S. PATENT DOCUMENTS

| | | | |
|---|---|---|---|
| 6,532,211 B1 * | 3/2003 | Rathonyi et al. | 370/230 |
| 6,775,268 B1 * | 8/2004 | Wang et al. | 370/352 |
| 6,804,532 B1 * | 10/2004 | Moon et al. | 455/552.1 |
| 7,286,535 B2 | 10/2007 | Ishikawa et al. | |
| 7,746,854 B2 | 6/2010 | Ambe et al. | |
| 2003/0065856 A1 | 4/2003 | Kagan et al. | |
| 2007/0058536 A1 * | 3/2007 | Vaananen et al. | 370/230 |
| 2008/0189432 A1 | 8/2008 | Abali et al. | |
| 2009/0119565 A1 * | 5/2009 | Park et al. | 714/748 |
| 2010/0039959 A1 * | 2/2010 | Gilmartin | 370/254 |
| 2010/0284404 A1 | 11/2010 | Gopinath et al. | |
| 2010/0315958 A1 * | 12/2010 | Luo et al. | 370/248 |
| 2012/0300669 A1 | 11/2012 | Zahavi | |
| 2012/0314706 A1 | 12/2012 | Liss | |
| 2013/0114599 A1 | 5/2013 | Arad | |

OTHER PUBLICATIONS

Shah et al., "Direct Data Placement over Reliable Transports", IETF Network Working Group, RFC 5041, Oct. 2007.
Culley et al., "Marker PDU Aligned Framing for TCP Specification", IETF Network Working Group, RFC 5044, Oct. 2007.

(Continued)

*Primary Examiner* — Omar Ghowrwal
(74) *Attorney, Agent, or Firm* — D. Kligler I.P. Services Ltd.

(57) ABSTRACT

A method for communication includes routing a first packet, which belongs to a given packet flow, over a first routing path through a communication network. A second packet, which follows the first packet in the given packet flow, is routed using a time-bounded Adaptive Routing (AR) mode, by evaluating a time gap between the first and second packets, routing the second packet over the first routing path if the time gap does not exceed a predefined threshold, and, if the time gap exceeds the predefined threshold, selecting a second routing path through the communication network that is potentially different from the first routing path, and routing the second packet over the second routing path.

22 Claims, 2 Drawing Sheets

(56) References Cited

OTHER PUBLICATIONS

Infiniband Trade Association, "InfiniBandTM Architecture Specification vol. 1", Release 1.2.1, Nov. 2007.

Leiserson, C E., "Fat-Trees: Universal Networks for Hardware Efficient Supercomputing", IEEE Transactions on Computers, vol. C-34, No. 10, pp. 892-901, Oct. 1985.

Ohring et al., "On Generalized Fat Trees", Proceedings of the 9th International Symposium on Parallel Processing, pp. 37-44, Santa Barbara, USA, Apr. 25-28, 1995.

Zahavi, E., "D-Mod-K Routing Providing Non-Blocking Traffic for Shift Permutations on Real Life Fat Trees", CCIT Technical Report #776, Technion—Israel Institute of Technology, Haifa, Israel, Aug. 2010.

Yuan et al., "Oblivious Routing for Fat-Tree Based System Area Networks with Uncertain Traffic Demands", Proceedings of ACM SIGMETRICS—the International Conference on Measurement and Modeling of Computer Systems, pp. 337-348, San Diego, USA, Jun. 12-16, 2007.

Matsuoka S., "You Don't Really Need Big Fat Switches Anymore—Almost", IPSJ SIG Technical Reports, vol. 2003, No. 83, pp. 157-162, year 2003.

Kim et al., "Technology-Driven, Highly-Scalable Dragonfly Topology", 35th International Symposium on Computer Architecture, pp. 77-78, Beijing, China, Jun. 21-25, 2008.

Jiang et al., "Indirect Adaptive Routing on Large Scale Interconnection Networks", 36th International Symposium on Computer Architecture, pp. 220-231, Austin, USA, Jun. 20-24, 2009.

Minkenberg et al., "Adaptive Routing in Data Center Bridges", Proceedings of 17th IEEE Symposium on High Performance Interconnects, New York, USA, pp. 33-41, Aug. 25-27, 2009.

Kim et al., "Adaptive Routing in High-Radix Clos Network", Proceedings of the 2006 ACM/IEEE Conference on Supercomputing (SC2006), Tampa, USA, Nov. 2006.

Gusat et al., "R3C2: Reactive Route & Rate Control for CEE", Proceedings of 18th IEEE Symposium on High Performance Interconnects, New York, USA, pp. 50-57, Aug. 10-27, 2010.

Wu et al., "DARD: Distributed adaptive routing datacenter networks", Proceedings of IEEE 32nd International Conference Distributed Computing Systems, pp. 32-41, Jun. 18-21, 2012.

Ding et al., "Level-wise scheduling algorithm for fat tree interconnection networks", Proceedings of the 2006 ACM/IEEE Conference on Supercomputing (SC 2006), 9 pages, Nov. 2006.

Joseph, S., "Adaptive routing in distributed decentralized systems: NeuroGrid, Gnutella & Freenet", Proceedings of Workshop on Infrastructure for Agents, MAS and Scalable MAS, Montreal, Canada, 11 pages, year 2001.

Martinez et al., "Supporting fully adaptive routing in Infiniband networks", Proceedings of the International Parallel and Distributed Processing Symposium (IPDPS'03), Nice, France, 10 pages, Apr. 22-26, 2003.

Kagan et al., U.S. Appl. No. 13/481,890, filed May 28, 2012.

Haramaty et al.,, U.S. Appl. No. 13/754,921, filed Jan. 31, 2013.

\* cited by examiner

HIGH-PERFORMANCE ADAPTIVE ROUTING

CROSS-REFERENCE TO RELATED APPLICATIONS

This application claims the benefit of U.S. Provisional Patent Application 61/254,756, filed Oct. 26, 2009, whose disclosure is incorporated herein by reference.

FIELD OF THE INVENTION

The present invention relates generally to communication networks, and particularly to methods and systems for adaptive routing.

BACKGROUND OF THE INVENTION

Various techniques for routing packets through communication networks are known in the art. Some known techniques select routing paths for packets based on the network state, e.g., traffic load or congestion. Such techniques are sometimes referred to as Adaptive Routing. AR techniques are described, for example, by Kim et al., in "Adaptive Routing in High-Radix Clos Network," Proceedings of the 2006 ACM/IEEE Conference on Supercomputing (SC2006), Tampa, Fla., November 2006, which is incorporated herein by reference.

SUMMARY OF THE INVENTION

An embodiment of the present invention that is described herein provides a method for communication, including:
routing a first packet, which belongs to a given packet flow, over a first routing path through a communication network; and
routing a second packet, which follows the first packet in the given packet flow, using a time-bounded Adaptive Routing (AR) mode, by:
evaluating a time gap between the first and second packets;
routing the second packet over the first routing path if the time gap does not exceed a predefined threshold; and
if the time gap exceeds the predefined threshold, selecting a second routing path through the communication network that is potentially different from the first routing path, and routing the second packet over the second routing path.

In some embodiments, routing the second packet includes selecting a routing mode for routing the second packet from a set of routing modes including at least:
the time-bounded AR mode;
a static routing mode in which routing the second packet includes routing the second packet unconditionally over the first routing path; and
an un-bounded AR mode in which routing the second packet includes selecting the second routing path that is potentially different from the first routing path irrespective of the time gap, and routing the second packet over the second routing path.

In an embodiment, selecting the routing mode includes choosing the routing mode responsively to one or more attributes of the second packet. In another embodiment, selecting the routing mode includes choosing the routing mode responsively to one or more attributes of the given packet flow. In yet another embodiment, selecting the routing mode includes classifying the second packet to a packet class selected from two or more packet classes, classifying the given flow to a flow class selected from two or more flow classes, and choosing the routing mode depending on both the packet class and the flow class. In still another embodiment, the method includes routing the second packet using the selected routing mode.

In some embodiments, the method includes setting the predefined threshold based on an expected propagation delay of the first and second packets in the communication network. In an embodiment, the method includes assessing a severity of packet re-ordering, and setting the predefined threshold based on the assessed severity of the packet re-ordering.

In a disclosed embodiment, routing the second packet includes sending the second packet to one of multiple ports of a network element, and selecting the second routing path includes assigning the ports respective grades that are indicative of traffic load levels of the ports, and choosing the one of the multiple ports based on the grades. In another embodiment, routing the second packet includes occasionally permitting setting of the second routing path to be different from the first routing path irrespective of the time gap. In an embodiment, time gaps between successive packets in the given packet flow do not exceed the predefined threshold, and permitting the setting of the second routing path includes occasionally enabling the time-bounded AR mode for the given packet flow regardless of the time gaps. In an embodiment, routing the second packet includes occasionally stalling the given flow in order to cause the time gap to exceed the predefined threshold.

There is additionally provided, in accordance with an embodiment of the present invention, a communication apparatus, including:
multiple ports for exchanging packets with a communication network;
a switch fabric, which is configured to forward the data packets between the ports so as to cause the packets to traverse routing paths through the communication network; and
a control unit, which is configured to cause the switch fabric to route a first packet belonging to a given packet flow over a first routing path, and to route a second packet that follows the first packet in the given packet flow, using a time-bounded Adaptive Routing (AR) mode, by evaluating a time gap between the first and second packets, routing the second packet over the first routing path if the time gap does not exceed a predefined threshold and, if the time gap exceeds the predefined threshold, selecting a second routing path that is potentially different from the first routing path, and routing the second packet over the second routing path.

The present invention will be more fully understood from the following detailed description of the embodiments thereof, taken together with the drawings in which:

DETAILED DESCRIPTION OF EMBODIMENTS

Overview

When applying Adaptive Routing (AR), packets belonging to the same flow may be routed over different routing paths, and therefore may reach their destination out of order. Packet re-ordering is one of the prime challenges of adaptive routing.

At the same time, AR schemes attempt to optimize the routing of packets, e.g., to increase throughput and reduce congestion. These two design goals are sometimes conflicting—AR schemes that are flexible in making re-routing decisions are often more prone to packet re-ordering, and vice versa.

Embodiments of the present invention that are described herein provide improved AR techniques, which provide a balanced and controllable trade-off between routing optimization and packet re-ordering. In some embodiments, a network element (e.g., network switch) routes packets using a time-bounded AR mode. In this mode, the network element is allowed to change the routing path for a given packet only if sufficient time has elapsed since the previous packet belonging to the same flow. If the elapsed time since the last packet is too short, the current routing path is retained. The time interval is typically configured to be large enough, so that the previous packet is likely to have reached the destination by the time the present packet is routed. As a result, packet re-ordering is avoided.

In some embodiments, the network element supports multiple routing modes, and selects the appropriate mode on a packet-by-packet basis. The routing modes may comprise, for example, a static routing mode, an unbounded AR mode in which routing decisions can be taken unconditionally, and the above-described time-bounded AR mode. In some embodiments, the network element selects the appropriate routing mode for a given packet based on attributes of the packet and attributes of the flow to which the packet belongs. This selection mechanism allows the user considerable flexibility in deciding which types of packets and flows are allowed to undergo AR (e.g., packets and flows that are less sensitive to packet re-ordering) and which types should undergo static routing.

System Description

Figure 1:
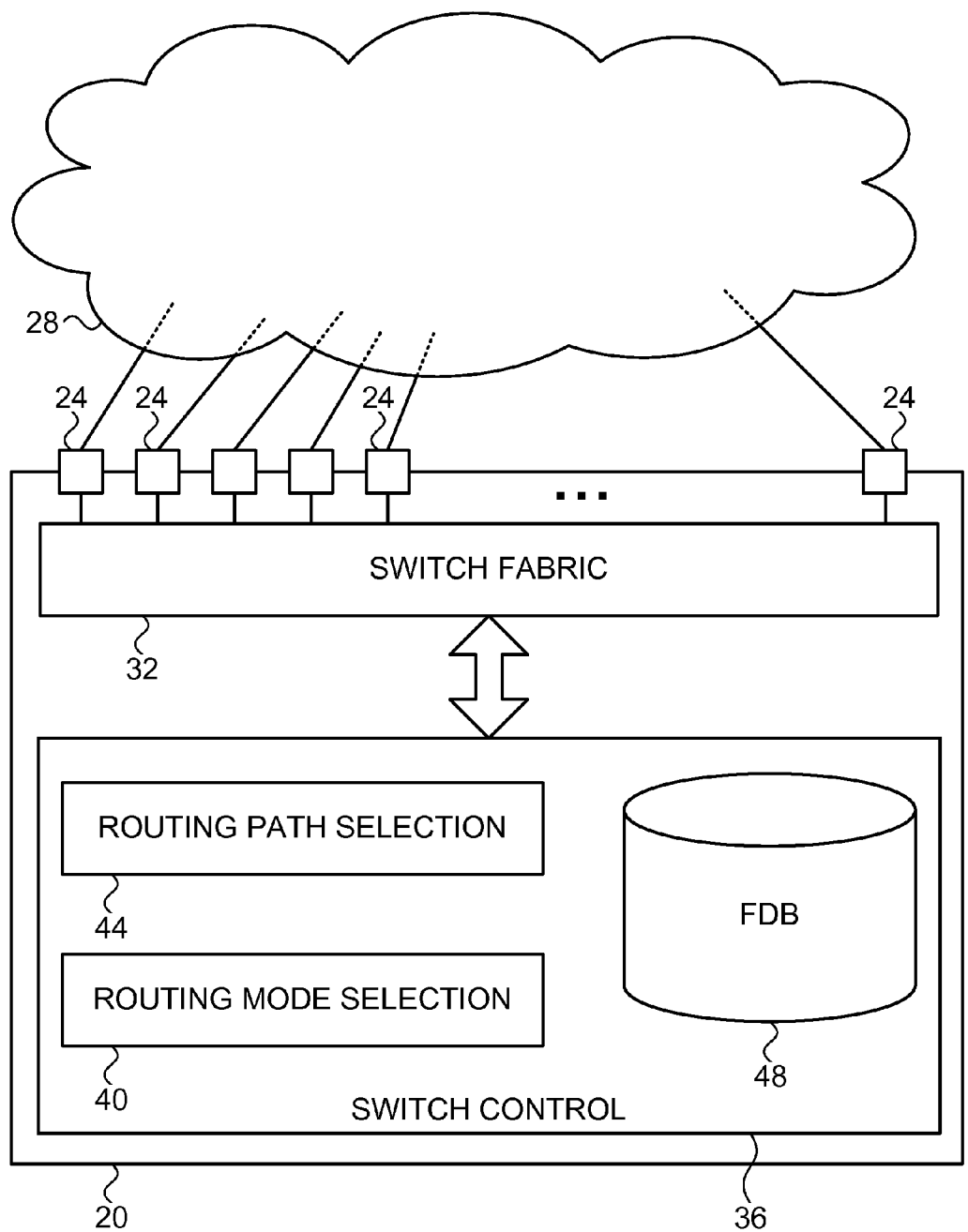
FIG. 1 is a block diagram that schematically illustrates a network switch, in accordance with an embodiment of the present invention.

FIG. 1 is a block diagram that schematically illustrates a network switch 20, in accordance with an embodiment of the present invention. Although the description that follows refers to a network switch, the disclosed techniques can be used with various other types of network elements, such as routers. Switch 20 comprises multiple ports 24 for exchanging data packets with a communication network 28. In the embodiments described herein, network 28 comprises an Ethernet network or an Infiniband network. Alternatively, however, network 28 may operate in accordance with any other suitable standard or protocol.

Switch 20 comprises a configurable switch fabric 32, which forwards packets between ports 24 in accordance with a certain routing plan. Typically, each packet belongs to a certain flow. By routing a certain flow to a certain port, fabric 32 causes the packets of that flow to be routed over a certain routing path through network 28. Thus, each flow is typically assigned a certain routing path at any given time, and all the packets of the flow are routed by fabric 32 over that routing path. Switch 20 typically routes multiple flows simultaneously.

In the context of the present patent application and in the claims, the term "packet" is used to describe the basic data unit that is routed through the network. Different network types and communication protocols use different terms for such data units, e.g., packets, frames or cells. All of these data units are regarded herein as packets.

The term "flow" refers to a sequence of packets, which transfer application data between a pair of end nodes. In some cases, although not necessarily, the packets in a given flow are required to arrive at the same order they were sent. Flows can generally be defined at various granularity levels. Typically, finer-granularity flows may require the switch to hold more state information (e.g., selected path and time bound timer per flow), and vice versa. In some embodiments, switch 20 can define the flow granularity based on the amount of free resources available.

The disclosed techniques can be used with various types and granularities of flows. A relatively fine-granularity flow may comprise, for example, a Transmission Control Protocol (TCP) socket that is defined by the Source IP address, Destination IP address, Protocol, Source TCP port and Destination TCP port. A relatively coarse-granularity flow may comprise, for example, a flow that is defined by destination host (Destination Address) and potentially groups multiple sockets and other types of communication into a single flow. Alternatively, any other suitable type of flow can be used.

Switch 20 comprises a switch control unit 36, which configures switch 32 to apply the desired routing plan. By controlling the routing plan, switch 20 is able to cause the packets to traverse various routing paths through network 28. In particular, control unit 36 selects a certain routing mode for each flow, and configures fabric 32 to apply the selected routing mode, as will be described below.

In some embodiments, control unit 36 comprises a routing mode selection unit 40, which selects an appropriate routing mode for each packet. Once a routing mode has been selected for a given packet by unit 40, a path selection unit 44 selects a routing path for the packet according to the applicable mode. Typically, unit 40 selects the routing mode based on both the packet and the flow. This technique is useful, for example, for assigning different routing modes to packets of different types within the same flow. In an example embodiment, a certain flow is defined by the destination address, and contains both TCP and User Datagram Protocol (UDP) packets that are addressed to this destination address. Switch 20 may assign a certain routing mode to the TCP packets, and a different routing mode to the UDP packets of the flow.

A Forwarding Database (FDB) 48 holds one or more currently-selected routing paths for each flow, as well as any other suitable information. In an example embodiment, FDB 48 holds the forwarding information per flow per mode (since, as explained above, packets of different types within a given flow may be assigned different routing modes). In some embodiments, FDB 48 also holds a set of possible forwarding options that switch 20 may choose from in case it is permitted to choose a new path using AR.

The configuration of switch 20 is an example configuration, which is chosen purely for the sake of conceptual clarity. In alternative embodiments, any other suitable configuration can also be used. The different elements of switch 20 may be implemented in hardware, such as using one or more Application-Specific Integrated Circuits (ASICs) or Field-Programmable Gate Arrays (FPGAs). In alternative embodiments, some elements of switch 20, e.g., unit 40 and/or unit 44, may be implemented in software executing on a suitable processor, or using a combination of hardware and software elements. FDB 48 is typically implemented using one or more memory devices, such as Random Access Memory (RAM) or Flash devices.

As noted above, certain elements of switch 20 may be implemented in software running on a suitable general-purpose processor, which is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

Routing Packets Using Multiple Routing Modes

As noted above, optimal and flexible Adaptive Routing (AR) sometimes comes at the cost of packet re-ordering, and vice versa. Some packet types and flow types are more sensitive to packet re-ordering than others. Therefore, a single AR scheme may not be optimal for all packet and flow types.

In some embodiments, switch 20 supports multiple routing modes, which provide different trade-offs between flexibility in AR decisions and avoidance of packet re-ordering. Mode selection unit 40 assigns each packet an appropriate routing mode, on a packet-by-packet basis. The mode is typically assigned as a function of one or more attributes of the packet and/or one or more attributes of the flow to which the packet belongs.

In an example embodiment, the switch supports three routing modes—a static routing mode, an unbounded AR mode, and a time-bounded AR mode. In the static routing mode, all the packets in a given flow are routed over a single pre-configured routing path (i.e., to the same port 24 of switch 20). Thus, in the static routing mode, AR is not permitted. In the unbounded AR mode, each packet may be assigned a different routing path, regardless of the routing paths that were used for the previous packets in the flow. In this mode, AR decisions (re-routing decisions) can be performed with maximum flexibility.

In the time-bounded AR mode, the routing path of a given packet can be modified (relative to the routing path of the previous packet in the flow) only if sufficient time has elapsed since the previous packet in the flow was routed. Typically, when processing a given packet, unit 44 evaluates the time gap between this packet and the previous packet in the same flow, and compares the time gap to a predefined threshold denoted $T_b$. if the time gap exceeds the threshold, unit 44 is permitted to find a new routing path for the present packet (which is potentially different from the current routing path that is assigned to the flow). If the time gap does not exceed the threshold, the current routing path assigned to the flow is retained for the present packet.

The threshold $T_b$ is typically set to a value that is on the order of the expected propagation delay through network 28. With a properly chosen $T_b$, the previous packet is likely to have reached the destination by the time the present packet is routed. As such, re-routing the present packet on a different routing path is unlikely to cause packet re-ordering. Various trade-offs between packet re-ordering and AR flexibility can be set by varying the size of threshold $T_b$. Typically, the threshold is pre-configured in switch 20 by an operator (e.g., network administrator), and may be modified by the operator as desired. In some embodiments, control unit 36 assesses the severity of packet re-ordering, and modifies $T_b$ based on the assessed packet re-ordering severity. In an example embodiment, unit 36 detects packet re-ordering events and modifies $T_b$ accordingly. For example, unit 36 may increase $T_b$ in response to detecting that the number or rate of re-ordering events exceeds a predefined threshold.

In some embodiments, unit 44 evaluates the time gap by holding a respective timer for each flow. The timers may be implemented in hardware or in software. The timer of a given flow counts the time that elapses from forwarding of the most recent packet in the flow. When a new packet in a given flow arrives, unit 44 compares the value of the timer of the given flow to $T_b$.

The three routing modes described above provide three different trade-offs between AR flexibility and likelihood of packet re-ordering. The static routing mode does not allow any AR decisions, but on the other hand causes no packet re-ordering. Static routing may be mandatory for some management protocols that require a constant routing path. The unbounded AR mode provides maximum flexibility in adaptively choosing routing paths for packets, at the cost of higher probability of packet re-ordering. The time-bounded AR mode offers an intermediate trade-off, which provides a high degree of re-routing flexibility at a relatively low probability of packet re-ordering.

The set of routing modes described above is given by way of example. In alternative embodiments, switch 20 may support any suitable subset comprising one or more of these modes. For example, the switch may support only the time-bounded AR mode, or only the static routing and the time-bounded AR modes. In some embodiments, any of the routing modes supported by the switch can be enabled or disabled by the operator.

Assigning Routing Modes to Packets

Routing mode selection unit 40 assigns routing modes to packets on a packet-by-packet basis. In an example embodiment, both the packet and the flow to which the packet belongs are classified as "restricted" or "unrestricted," and the packet is then assigned an appropriate routing mode based on these classifications. Classifying a packet or flow as unrestricted means that AR is generally permitted for this packet or flow. Classifying a packet or flow as restricted means that AR is generally not allowed for this packet or flow. In some embodiments, a flow can also be classified as "time restricted," meaning that AR is permitted with certain inter-packet time gap restrictions. In some embodiments, a packet may be classified as "legacy," meaning that only static routing is permitted for this packet.

Unit 40 may use various criteria for classifying packets as restricted or unrestricted. For example, some packets may have a reserved "AR" header bit, which indicates whether the packet is permitted to undergo AR or not. In some embodiments, if the AR bit of a given packet is set, and at least one of the AR modes (unbounded and/or time-bounded AR modes) is enabled, then unit 40 classifies the packet as unrestricted.

As another example, unit 40 may hold a list ("filter") of one or more transport protocols that are permitted to undergo AR. In these embodiments, unit 40 classifies a packet as unrestricted if the packet matches the filter. This mechanism enables the switch to differentiate between transport protocols that are less sensitive to packet re-ordering (e.g., User Datagram Protocol—UDP) and transport protocols that are more sensitive to packet re-ordering (e.g., Transmission Control Protocol—TCP), and assign each protocol a routing mode accordingly.

As yet another example, unit 40 may classify a packet as unrestricted based on User Priority (UP). As another example, a packet may be classified as unrestricted based on its destination address. In these embodiments, unit 40 may set a certain mask on the packet destination address, and classify packets that match the mask as unrestricted. In some embodiments, unit 40 may use any combination of one or more of the above-described criteria, and/or any other suitable criteria, for classifying packets as restricted or unrestricted. Typically, a packet is classified as unrestricted if it matches the applicable criteria, and as restricted otherwise.

Unit 40 may classify each flow as restricted or unrestricted using any suitable criteria, for example based on the destination address of the flow. Typically, the classification of each flow is recorded in FDB 48.

Based on the classification of packets and flows, unit 40 assigns each packet an appropriate routing mode. The following table shows an example scheme of routing mode selection based on packet and flow classification:

| Flow classification | Packet classification | | |
|---|---|---|---|
| | Unrestricted | Restricted | Legacy |
| Legacy | Static | Static | Static |
| Restricted | Unbounded AR | Static | Static |
| Time-restricted | Unbounded AR | Time-bounded AR | Static |
| Unrestricted | Unbounded AR | Unbounded AR | Static |

The table above is shown purely by way of example. In alternative embodiments, any other suitable mode assignment scheme can also be used. Typically, the mode assignment policy, whether represented by a table or otherwise, is configurable and may be modified by the operator as desired.

During operation of switch 20, unit 40 assigns each packet one of the routing modes, unit 44 selects a routing path for the packet in accordance with the selected routing mode, and fabric 32 routes the packet over the selected routing path.

Selection of Routing Paths

In the embodiments described herein, the AR process is partitioned into two consecutive stages. In the first stage, unit 40 assigns a routing mode to a given packet (i.e., decides whether, and to what extent, AR is permitted). Then, unit 44 selects a routing path for the packet (which may be the same as or different from the existing routing path of the flow, depending on the assigned routing mode and the current congestion status). In the present example, unit 44 selects a routing path by selecting a port 24 of switch 20 over which to route the packet.

For packets that are assigned the static routing mode, unit 44 retains the same routing path that was used for routing the previous packet in the flow. The current routing path for each flow is typically stored in FDB 48 and can be accessed by unit 44 as desired. For packets that are assigned the time-bounded AR mode, but for which the time gap since the previous packet in the flow does not exceed threshold $T_b$, unit 44 also retains the same routing path that was used for routing the previous packet in the flow.

For packets that are assigned the unbounded AR mode, and for packets that are assigned the time-bounded AR mode and for which the time gap since the previous packet in the flow exceeds threshold $T_b$, unit 44 finds a new routing path. In a typical embodiment, unit 44 finds a new path for such packets only if a better (e.g., less loaded) path exists within the group of possible ports. The new routing path may be the same as or different from the current routing path assigned to the flow. If the new routing path is different, unit 44 updates the new path in FDB 48.

Unit 44 may use various policies and criteria for selecting a new routing path for a given packet. In the description that follows, the terms "selecting a routing path over which to route the packet" and "selecting a port over which to route the packet" are used interchangeably. For example, unit 44 may choose the port at random. As another example, unit 44 may choose the port in a "greedy random" manner, i.e., choose the least-loaded port from a randomly-selected group of ports. In other embodiments, unit 44 may select the port based on the current status of the ports, and/or the past (historical) status of the ports. In some embodiments, unit 44 may use any suitable combination of such criteria, and/or any other suitable criteria, for selecting the new port over which to route the packet.

Typically, unit 44 attempts to route packets over ports that are not heavily loaded, in order to balance the traffic load and avoid congestion. In an example embodiment, unit 44 selects a subset of ports at random, and then selects the least-loaded port from the randomly-selected subset. In some embodiments, unit 44 assigns each port 24 a respective grade, which expresses the load on the port. In the description that follows, lower grade corresponds to lower load on the port and vice versa, and unit 44 typically selects the port having the lowest grade for routing the packet. This convention, however, is used purely for convenience. In alternative embodiments, the opposite convention (high grade corresponds to low load, routing over ports having highest grades) may be used.

In an example embodiment, unit 44 sets the grade of a given port based on the depth of the port (i.e., the number of bytes that are queued for output through the port), the class-specific depth of the port (i.e., the number of bytes that are queued in the port and correspond to the same traffic class as the packet being processed), and the utilized bandwidth on the port.

In an embodiment, the utilized bandwidth is approximated by calculating a running average of the bandwidth of the outgoing traffic transmitted through the port. The utilized bandwidth is particularly useful in low load conditions, when the port does not experience backpressure. In some embodiments, the amount of backpressure is factored into the port utilization level.

In an embodiment, each of the three parameters is quantized to four possible levels by comparing them to three thresholds. In other words, the port depth, class-specific depth and utilization are each assigned a level of 0 . . . 3. The total grade of the port, e.g., also between 0 . . . 3, is computed based on the three levels. Any suitable mapping, which sets the total grade of the port based on the port depth, class-specific depth and utilization, can be used. The mapping can be represented by a Look-Up Table (LUT), by a function or using any other suitable means.

Further alternatively, any subset of the three above-described parameters (port depth, class-specific depth and utilization), and/or any other suitable parameter, can be used to grade the port. Typically, when unit 44 attempts to find a new routing path for a given packet, it will attempt to route the packet via the port having the lowest grade, i.e., the least-loaded port. In some embodiments, however, there may be exceptions to this rule.

For example, unit 44 may also consider the current port that is used for routing the flow to which the packet belongs. If the currently-used port has a sufficiently-low grade (e.g., a grade that is lower than a predefined threshold), unit 44 may retain this port (i.e., refrain from re-routing) even though another port may have a lower grade. This mechanism reduces the likelihood of re-routing (and the resulting increase in packet re-ordering) when the current path is not congested. In other words, in order to justify re-routing, the currently-used port should be heavily loaded, and at least one other port should be less loaded.

In some embodiments, the flow in question has a predefined default routing path (or, equivalently, a default port 24 over which the flow is routed). Unit 44 may revert to the default routing path if its grade is sufficiently low. In alternative embodiment, unit 44 may apply any other suitable method for setting new routing paths (ports) for packets in the unbounded and time-bounded AR modes.

Avoiding Routing Inefficiency in Time-Bounded AR Mode

Consider a flow of packets that are routed using the time-bounded AR mode. If the time gaps between successive packets in this flow are smaller than threshold $T_b$, re-routing of the flow will not be permitted, and the routing of this flow will remain essentially static. A scenario of this sort may cause some routing inefficiency, since the switch will not attempt to find a better routing path for this flow even though it is permitted to use AR for the flow. The packets of this flow may be routed through a congested port even though a less loaded port may exist.

In some embodiments, unit 44 in switch 20 takes measures to avoid this sort of inefficiency. In some embodiments, unit 44 stalls the packets of the flow in question for a certain time period, typically for longer than $T_b$. This stalling operation artificially creates time gap between packets that is larger than $T_b$. As a result, the time-bounded AR criterion is met, and unit 44 will be allowed to re-route the flow to a different routing path if needed.

In alternative embodiments, unit 44 occasionally ignores, or overrides, the time-bounded AR criterion. In other words, unit 44 occasionally permits re-routing of packets even though the time gap between successive packets does not exceed $T_b$. This technique may introduce some packet re-ordering that should be tolerated, while allowing better utilization of fabric resources.

In some embodiments, unit 44 performs these measures (e.g., stalls the flow) in response to verifying that re-routing is desirable. For example, unit 44 may stall the flow after examining the grades of the currently-used port and at least one other port, and verifying that re-routing to another port is advantageous.

Unit 44 may use various policies in order to avoid excessive stalling or overriding of the time-bounded AR criterion. In one embodiment, unit 44 applies a configurable leaky bucket mechanism to control the rate of these actions. Alternatively, unit 44 may allow stalling or overriding in a given flow only once per a given number of packets or per time interval.

Packet Routing Method Description

Figure 2:
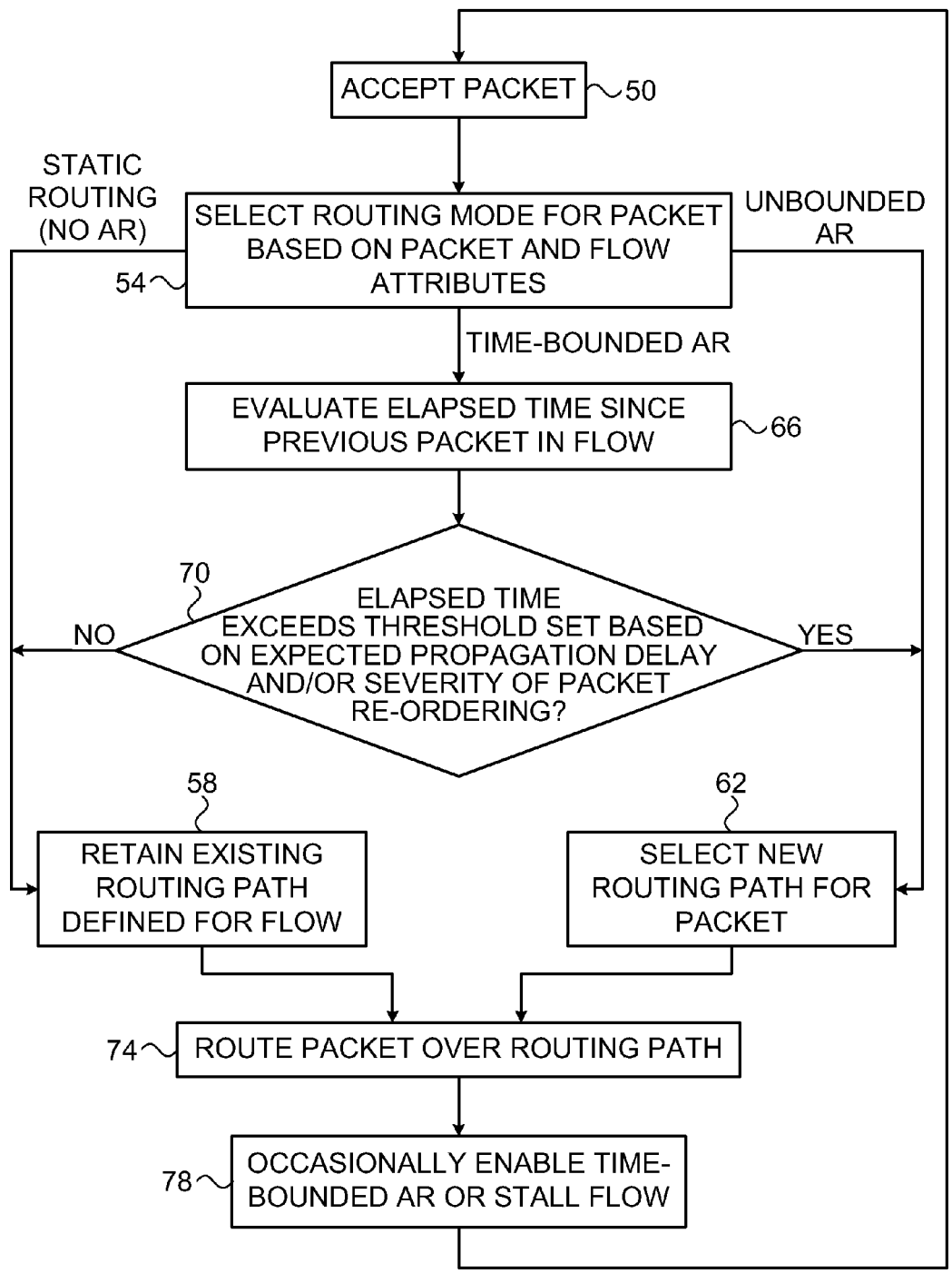
FIG. 2 is a flow chart that schematically illustrates a method for packet routing, in accordance with an embodiment of the present invention.

FIG. 2 is a flow chart that schematically illustrates a method for packet routing, which is carried out by switch 20 in accordance with an embodiment of the present invention. The method begins with switch 20 accepting a packet via one of ports 24, at an input step 50. The packet belongs to a given flow, for which a certain routing path is recorded in FDB 48. In particular, the routing path defines a certain port to which the packet is to be routed by fabric 32.

Mode selection unit 40 is switch 20 selects a routing mode to be used for routing the input packet, at a mode selection step 54. The selected routing mode may comprise the static routing mode, the unbounded AR mode or the time-bounded AR mode, as explained above.

If the selected mode comprises the static routing mode, path selection unit 44 retains the existing routing path (and the existing port) that is assigned to the flow, at a path retaining step 58. If the selected mode comprises the unbounded AR mode, unit 44 selects a new routing path (port) for routing the packet, at a re-routing step 62. The new path may the same as or different from the existing path.

If the selected mode comprises the time-bounded AR mode, path selection unit 44 evaluates the time that elapsed since the previous packet of the same flow, at a time gap evaluation step 66. Unit 44 checks whether the evaluated time gap exceeds threshold $T_b$, at a threshold checking step 70. As explained above, threshold $T_b$ has been set based on the expected packet propagation delay and/or severity of packet re-ordering. If the time gap does not exceed the threshold, unit 44 retains the existing routing path at step 58. If, on the other hand, the time gap exceeds the threshold, unit 44 selects a new routing path at re-routing step 62.

Unit 44 controls switch fabric 32 to apply the selected routing path (new or existing), and fabric 32 routes the packet over this path, at a routing step 74. As explained above, unit 40 occasionally enables time-bounded AR irrespective of the threshold, or stalls the packet flow, at an enabling step 78. The method then loops back to input step 50 for processing the next packet.

It will be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

The invention claimed is:

1. A method for communication, comprising:
   routing a first packet, which belongs to a given packet flow, over a first routing path through a communication network to a destination; and
   routing a second packet, which follows the first packet in the given packet flow, while reducing a likelihood that the second packet will reach the destination before the first packet, using a time-bounded Adaptive Routing (AR) mode, by:
   evaluating a time gap between the first and second packets;
   routing the second packet over the first routing path when the time gap does not exceed a predefined threshold, which is set to a value that is based on an expected propagation delay of the first packet; and
   when the time gap exceeds the predefined threshold, selecting a second routing path through the communication network that is potentially different from the first routing path, and routing the second packet over the second routing path.

2. The method according to claim 1, wherein routing the second packet comprises selecting a routing mode for routing the second packet from a set of routing modes comprising at least:
   the time-bounded AR mode;
   a static routing mode in which routing the second packet comprises routing the second packet unconditionally over the first routing path; and
   an un-bounded AR mode in which routing the second packet comprises selecting the second routing path that is potentially different from the first routing path irrespective of the time gap, and routing the second packet over the second routing path.

3. The method according to claim 2, wherein selecting the routing mode comprises choosing the routing mode responsive to one or more attributes of the second packet.

4. The method according to claim 2, wherein selecting the routing mode comprises choosing the routing mode responsive to one or more attributes of the given packet flow.

5. The method according to claim 2, wherein selecting the routing mode comprises classifying the second packet to a packet class selected from two or more packet classes, classifying the given flow to a flow class selected from two or more flow classes, and choosing the routing mode depending on both the packet class and the flow class.

6. The method according to claim 2, and comprising routing the second packet using the selected routing mode.

7. The method according to claim 1, and comprising assessing a severity of packet re-ordering, and setting the predefined threshold based on the assessed severity of the packet re-ordering.

8. The method according to claim 1, wherein routing the second packet comprises sending the second packet to one of multiple ports of a network element, and wherein selecting the second routing path comprises assigning the ports respective grades that are indicative of traffic load levels of the ports, and choosing the one of the multiple ports based on the grades.

9. The method according to claim 1, wherein routing the second packet comprises permitting setting of the second routing path to be different from the first routing path irrespective of the time gap.

10. The method according to claim 9, wherein time gaps between successive packets in the given packet flow do not exceed the predefined threshold, and wherein permitting the setting of the second routing path comprises enabling the time-bounded AR mode for the given packet flow regardless of the time gaps.

11. The method according to claim 1, wherein routing the second packet comprises stalling the given flow in order to cause the time gap to exceed the predefined threshold.

12. A communication apparatus, comprising:
multiple ports for exchanging packets with a communication network;
a switch fabric, which is configured to forward the data packets between the ports so as to cause the packets to traverse routing paths through the communication network; and
a control unit, which is configured to cause the switch fabric to route a first packet belonging to a given packet flow over a first routing path to a destination, and to route a second packet that follows the first packet in the given packet flow, while reducing a likelihood that the second packet will reach the destination before the first packet, using a time-bounded Adaptive Routing (AR) mode, by evaluating a time gap between the first and second packets, routing the second packet over the first routing path when the time gap does not exceed a predefined threshold, which is set to a value that is based on an expected propagation delay of the first packet, and, when the time gap exceeds the predefined threshold, permitting selection of a second routing path that is different from the first routing path, and routing of the second packet over the second routing path.

13. The apparatus according to claim 12, wherein the control unit is configured to select a routing mode for routing the second packet from a set of routing modes comprising at least:
the time-bounded AR mode;
a static routing mode in which routing the second packet comprises routing the second packet unconditionally over the first routing path; and
an un-bounded AR mode in which routing the second packet comprises selecting the second routing path that is potentially different from the first routing path irrespective of the time gap, and routing the second packet over the second routing path.

14. The apparatus according to claim 13, wherein the control unit is configured to select the routing mode responsive to one or more attributes of the second packet.

15. The apparatus according to claim 13, wherein the control unit is configured to select the routing mode responsive to one or more attributes of the given packet flow.

16. The apparatus according to claim 13, wherein the control unit is configured to classify the second packet to a packet class selected from two or more packet classes, to classify the given flow to a flow class selected from two or more flow classes, and to select the routing mode depending on both the packet class and the flow class.

17. The apparatus according to claim 13, wherein the control unit is configured to route the second packet using the selected routing mode.

18. The apparatus according to claim 12, wherein the control unit is configured to assess a severity of packet re-ordering, and to set the predefined threshold based on the assessed severity of the packet re-ordering.

19. The apparatus according to claim 12, wherein the control unit is configured to route the second packet by sending the second packet to one of the multiple ports, and to select the second routing path by assigning the ports respective grades that are indicative of traffic load levels of the ports, and choosing the one of the multiple ports based on the grades.

20. The apparatus according to claim 12, wherein the control unit is configured to occasionally permit setting of the second routing path to be different from the first routing path irrespective of the time gap.

21. The apparatus according to claim 20, wherein time gaps between successive packets in the given packet flow do not exceed the predefined threshold, and wherein the control unit is configured to enable the time-bounded AR mode for the given packet flow regardless of the time gaps by permitting the setting of the second routing path.

22. The apparatus according to claim 12, wherein the control unit is configured to stall the given flow in order to cause the time gap to exceed the predefined threshold.

* * * * *